(12) United States Patent
Hudson

(10) Patent No.: US 8,596,659 B2
(45) Date of Patent: Dec. 3, 2013

(54) STEERABLE SUSPENSION SYSTEM WITH CENTERING ACTUATOR

(75) Inventor: Herbert Hudson, McKinney, TX (US)

(73) Assignee: Watson & Chalin Manufacturing, Inc., McKinney, TX (US)

( * ) Notice: Subject to any disclaimer, the term of this patent is extended or adjusted under 35 U.S.C. 154(b) by 113 days.

(21) Appl. No.: 13/095,588

(22) Filed: Apr. 27, 2011

(65) Prior Publication Data

US 2012/0274040 A1 Nov. 1, 2012

(51) Int. Cl.
*B62D 7/22* (2006.01)
(52) U.S. Cl.
USPC ............ 280/89.11; 280/89.13; 280/90; 92/13
(58) Field of Classification Search
USPC ............ 280/81.5, 81.6, 89.11, 89.13, 90, 89, 280/89.12; 180/414, 417, 442; 92/13; 188/288
See application file for complete search history.

(56) References Cited

U.S. PATENT DOCUMENTS

| 2,931,180 | A | * | 4/1960 | Randol | 60/553 |
| 2,952,474 | A | * | 9/1960 | Rene | 280/5.52 |
| 3,716,249 | A | * | 2/1973 | Schaeff | 280/81.6 |
| 3,921,773 | A | * | 11/1975 | Dietrich | 192/83 |
| 4,410,193 | A | * | 10/1983 | Howard | 280/90 |
| 4,534,577 | A | * | 8/1985 | Howard | 180/400 |
| 4,588,198 | A | * | 5/1986 | Kanazawa et al. | 280/90 |
| 5,620,194 | A | * | 4/1997 | Keeler et al. | 280/81.6 |
| 6,062,578 | A | * | 5/2000 | Richardson | 280/81.6 |
| 6,272,947 | B1 | * | 8/2001 | Howard | 74/499 |
| 6,398,239 | B1 | | 6/2002 | Chalin | |
| 6,817,620 | B1 | * | 11/2004 | Howard | 280/89.11 |
| 7,207,579 | B1 | * | 4/2007 | Howard | 280/89.11 |
| 7,207,580 | B2 | * | 4/2007 | Howard | 280/89.11 |

OTHER PUBLICATIONS

IMT Ingersoll Division Canron INC.; "Self Steer Axel Feature/ Specifications", product information, undated, 4 pages.
KGI; "Self Steer Axles", product brochure, undated 1 page.
KGI; "Self Steer Axles: KGS-250", product catalog, undated 5 pages.
Watson & Chalin Manufacturing INC.; "Reverse Lockout Kit for Steerable", Drawing No. 12885, dated Oct. 11, 1995, 1 page.
Watson & Chalin Manufacturing INC.; "Reverse Lockout/Steering Stabilier Kit", Drawing No. 980063, dated Mar. 26, 1998, 1 page.
Watson & Chalin Manufacturing INC.; "Lockout Device V-Bar Weld-On", Drawing No. 980065, dated Nov. 4, 1998, 1 page.
Watson & Chalin Manufacturing INC.; "Centering Kit W/Optional Adjustable Push-Rod", Drawing No. 980104, dated Mar. 24, 2000, 1 page.

* cited by examiner

*Primary Examiner* — Paul N Dickson
*Assistant Examiner* — Timothy Wilhelm
(74) *Attorney, Agent, or Firm* — Smith IP Services, P.C.

(57) ABSTRACT

A steerable suspension system may include a steering knuckle and an actuator, the actuator having an effective piston area which varies in response to rotation of the steering knuckle. A method of stabilizing a steerable suspension system may include applying a first level of pressure, thereby applying a stabilizing force to a steering knuckle and permitting rotation of the steering knuckle, and applying a second level of pressure, thereby preventing rotation of the steering knuckle. Another steerable suspension system may include an axle, a tie rod arm, and a pressure operated actuator interconnected between the tie rod arm and the axle.

30 Claims, 6 Drawing Sheets

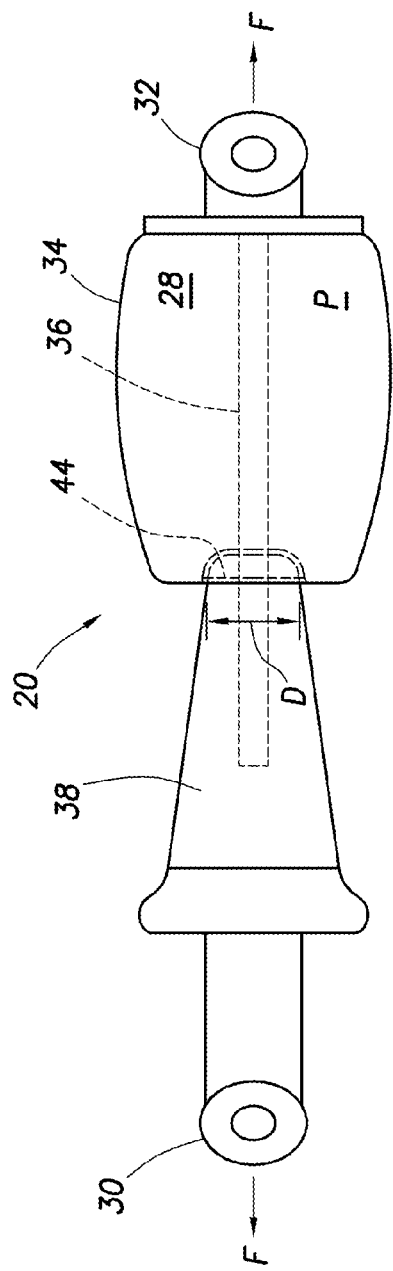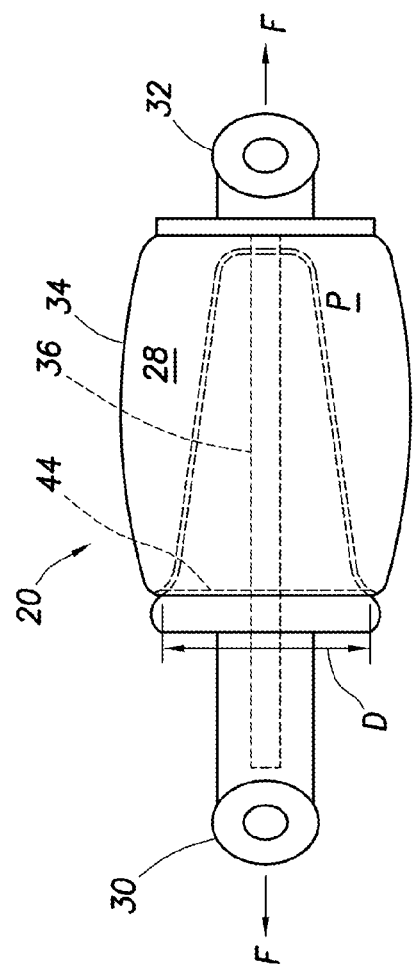
FIG.4a
FIG.4b

STEERABLE SUSPENSION SYSTEM WITH CENTERING ACTUATOR

BACKGROUND

This disclosure relates generally to vehicle suspension systems and, in an example described herein, more particularly provides a steerable suspension system with centering actuator.

Federal regulations restrict motor vehicles to a maximum weight per axle of 20,000 lbs. Additional axles are included with many vehicles, such as cement trucks and tractor/trailer rigs, to allow these vehicles to carry weights greater than 20,000 lbs. However, additional axles reduce a vehicle's turning radius which impairs the vehicle's maneuverability. A steerable suspension system enables the vehicle to carry additional weight without reducing the vehicle's turning radius, but can be problematic when backing up the vehicle. Therefore, it can be seen that improvements in the art are needed.

SUMMARY

In the disclosure below, a steerable suspension system and associated method are provided which solve at least one problem in the art. One example is described below in which an actuator has an effective piston area that varies in response to rotation of a steering knuckle. Another example is described below in which a pressure operated actuator is interconnected between a tie rod arm and an axle.

In one aspect, a steerable suspension system is provided which may include a steering knuckle and an actuator. An effective piston area of the actuator may vary in response to rotation of the steering knuckle.

In another aspect, a method of stabilizing a steerable suspension system is provided which may include the steps of: applying a first level of pressure, thereby applying a stabilizing force to a steering knuckle and permitting rotation of the steering knuckle; and applying a second level of pressure, thereby preventing rotation of the steering knuckle.

In yet another aspect, a steerable suspension system is provided which may include an axle, a tie rod arm, and a pressure operated actuator interconnected between the tie rod arm and the axle.

These and other features, advantages and benefits will become apparent to one of ordinary skill in the art upon careful consideration of the detailed description of representative examples below and the accompanying drawings, in which similar elements are indicated in the various figures using the same reference numbers.

BRIEF DESCRIPTION OF THE DRAWINGS

FIG. 4a is a representative side view of the actuator of FIG. 3a in its fully extended position.

FIG. 4b is a representative side view of the actuator of FIG. 3a in its fully compressed position.

DETAILED DESCRIPTION

Figure 1:
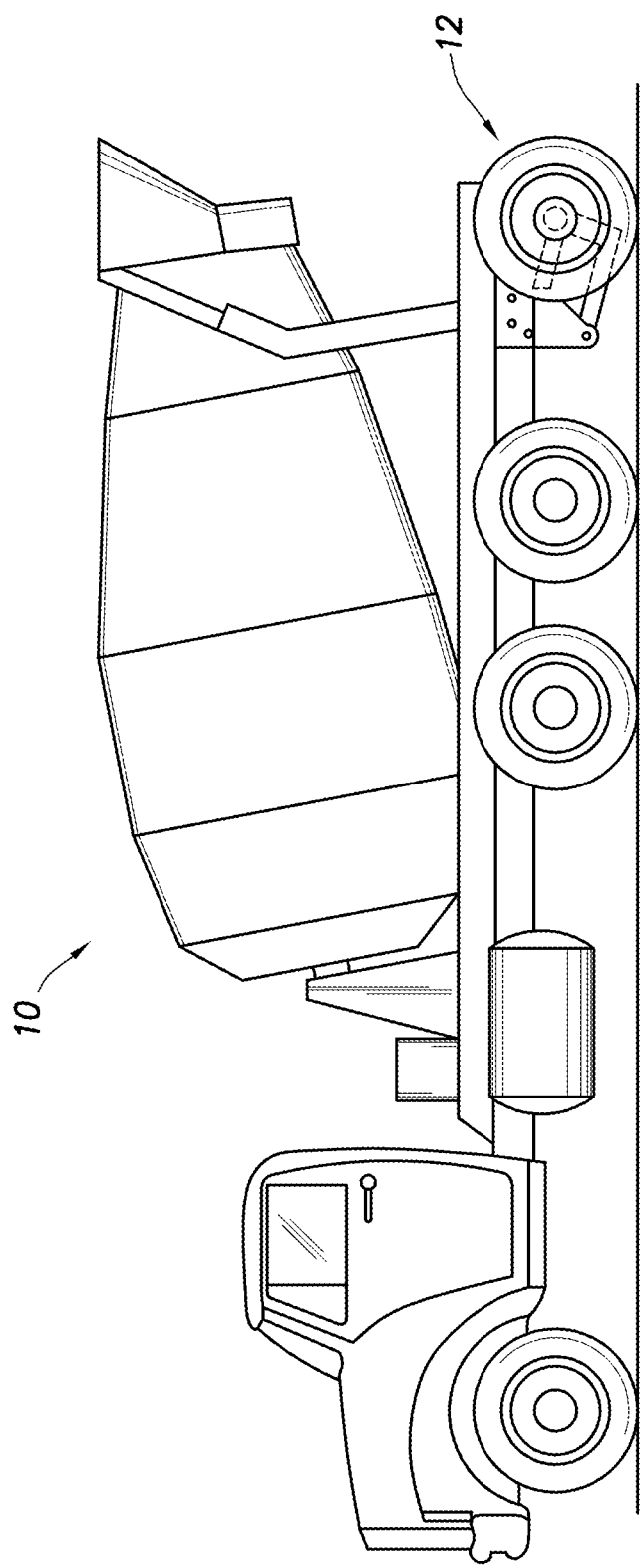
FIG. 1 is a representative side view of a vehicle which can embody principles of this disclosure.

Representatively illustrated in FIG. 1 is a vehicle 10 which can incorporate a steerable suspension system 12 and associated method that can embody principles of this disclosure. It is to be understood that the steerable suspension system 12 can be utilized in other vehicles such as a motor coach, a dump truck, heavy-duty all-terrain vehicles, etc. The vehicle 10 is merely a representative example in which the system 12 may be used. Therefore, it should be understood that the steerable suspension system 12 is not restricted to the example depicted in FIG. 1.

Figure 2:
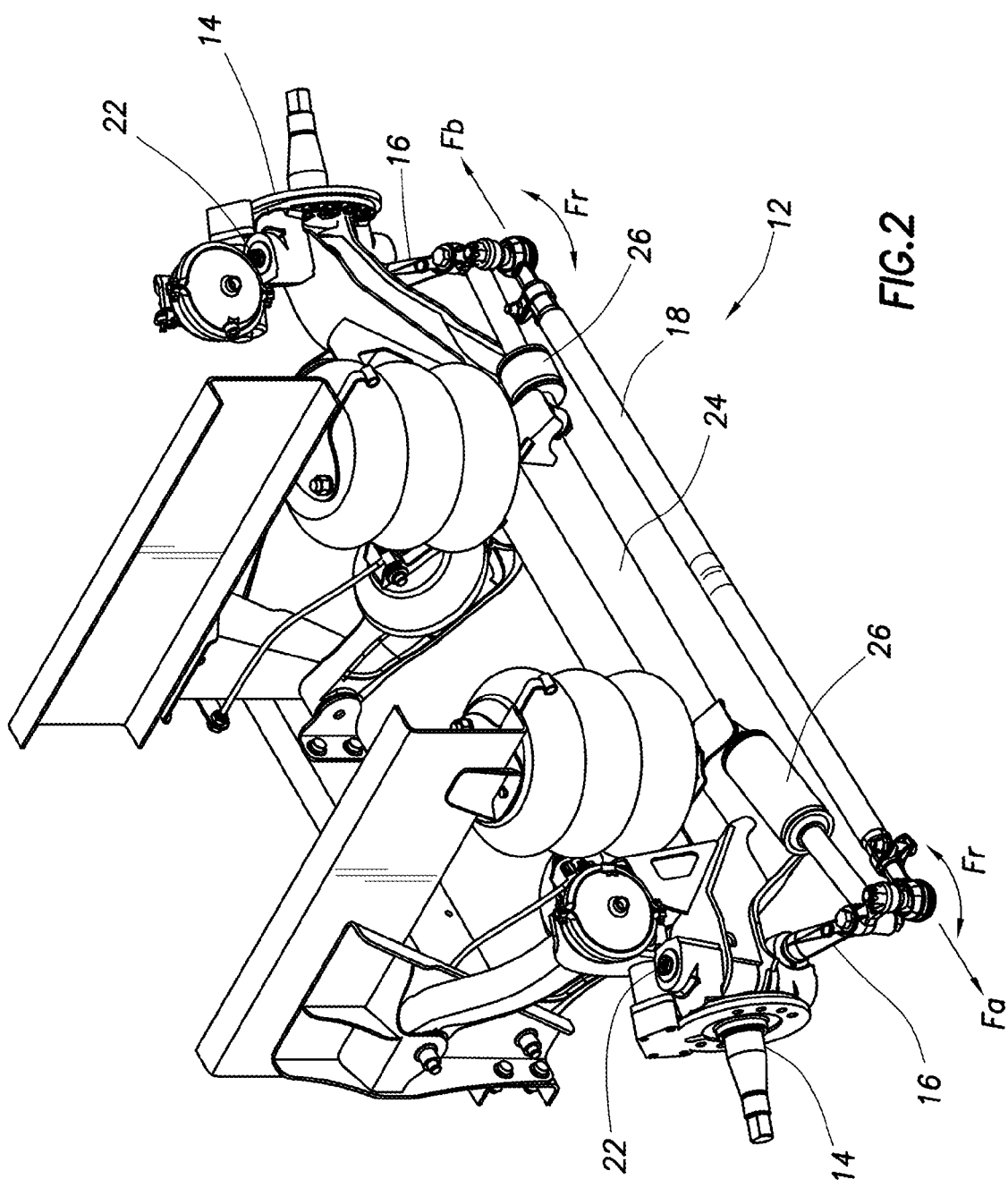
FIG. 2 is a representative rear perspective view of a steerable suspension system which can be used in the vehicle of FIG. 1, and which can embody principles of this disclosure.

Referring additionally now to FIG. 2, the steerable suspension system 12, which can embody principles of this disclosure, is representatively illustrated. The system 12 may include steering knuckles 14 pivotably attached to an axle 24 by respective king pins 22. Tie rod arms 16 are rigidly attached to their respective steering knuckles 14 and extend outward relative to the king pins 22.

A tie rod 18 is pivotably attached to the tie rod arms 16 and extends across the steerable suspension system 12 generally parallel to the axle 24. The tie rod 18 links the steering knuckles 14, so that they rotate together.

Actuators 26 are interconnected between the respective tie rod arms 16 and the axle 24. The actuators 26 apply a stabilization force to the tie rod arms 16. The stabilization force resists movement of the tie rod arms 16 and, therefore, resists rotation of the respective steering knuckles 14.

However, it is not necessary for the actuators 26 to be interconnected between the tie rod arms 16 and the axle 24. For example, the actuators 26 may instead be interconnected between the axle 24 and the tie rod 18 without connecting to the tie rod arms 16.

As another example, the actuators 26 could be interconnected between the axle 24 and the respective steering knuckles 14 or between the axle 24 and another set of tie rod arms rigidly attached to the steering knuckles 14, etc.

Therefore, it can readily be seen that there are various ways in which the actuators 26 may be assembled in the suspension system 12 in keeping with the principles of this disclosure.

The actuators 26 may apply a stabilization force to the steering knuckles 14 to resist rotation of the steering knuckles. The stabilization force may remain constant, however, it is preferred that the stabilization force vary in response to the rotation of the steering knuckles 14. It can be readily seen that there are many ways to vary the stabilization force in keeping with the principles of this disclosure. For example, the stabilization force could be varied by adjusting a pressure level applied to a piston or pistons of the actuators 26, varying a piston area of the actuators 26, mechanically adjusting a biasing spring (not shown), etc.

Figure 3A:
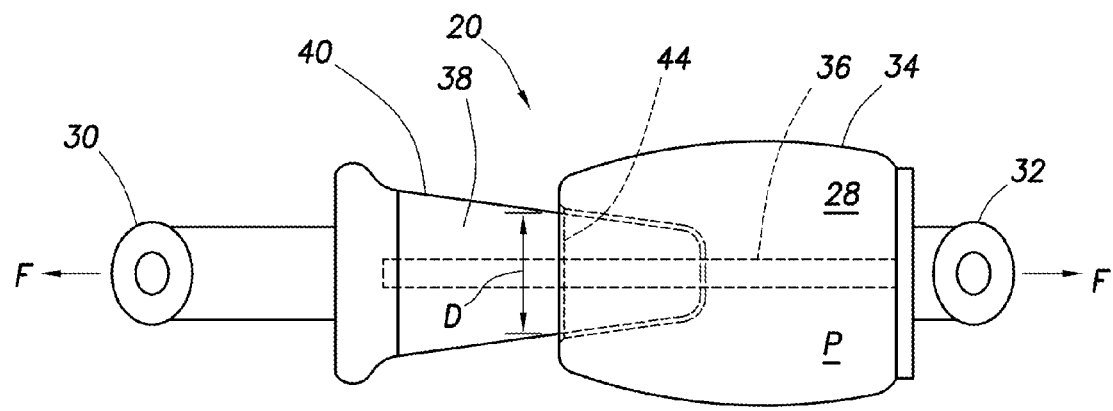
FIG. 3a is a representative side view of a pressure operated actuator which can be used in the suspension system of FIG. 2.

Referring additionally now to FIG. 3a, a pressure operated actuator 20, which can embody principles of this disclosure, is representatively illustrated. The actuator 20 may be substituted for the actuators 26 in FIG. 2. The actuators 20 vary the stabilization force in response to rotation of the steering knuckles 14. The actuators 20 can also apply a force to the steering knuckles 14 to move the tie rod 18 to a centered position. The "centered position" referring generally to when the tie rod 18 is approximately midway through the tie rod's 18 side to side travel.

However, it is not necessary that the actuators 26 be pressure operated. The actuators 26 can also be operated by other operating means such as electrically operated, magnetically operated, operated by various mechanical means other than pressure, operated by a combination of these operating means, etc.

The actuator 20 may include attachment ends 30, 32 which may be used to pivotably attach the actuator 20 to the axle 24 and one of the tie rod arms 16. Preferably, end 30 may be pivotably attached to the axle 24 and end 32 may be pivotably attached to one of the tie rod arms 16. However, the attachment ends 30, 32 may be assembled in various ways in keeping with the principles of this disclosure.

For example, end 30 may be pivotably attached to one of the tie rod arms 16, and end 32 may be pivotably attached to the axle 24. As another example, end 30 may be pivotably attached to the axle 24 and end 32 may be pivotably attached to the tie rod 18, instead of to the tie rod arm 16.

Therefore, it should be understood that there are various ways in which the ends 30, 32 may be assembled in the suspension system 12 in keeping with the principles of this disclosure.

The actuator 20 may include a fluid 28 disposed within a bladder 34 and pressurized to pressure P (the fluid may be a gas, a liquid, a combination of gas and liquid, etc.). A frusto-conical shaped surface 40 may cause a piston diameter D to vary as the actuator 20 is extended (i.e. distance between ends 30 and 32 is increased) or compressed (i.e. distance between ends 30 and 32 is decreased). An alignment rod 36 can maintain alignment of the actuator 20 during extensions and compressions.

As the pressure operated actuator 20 is extended (FIG. 4a), the frusto-conical shaped surface 40 is retracted from the bladder 34, which decreases pressure P and decreases the piston diameter D of the actuator 20, thus decreasing the effective piston area 44. The decreased pressure P and/or the decreased effective piston area 44 cause a force F output by the actuator 20 to decrease.

However, it is not necessary for both the pressure P and the effective piston area 44 to decrease to cause the force F output by the actuator 20 to decrease. The force F may be caused to decrease when only one of the pressure P and the effective piston area 44 decrease.

As the pressure operated actuator 20 is compressed (FIG. 4b), the frusto-conical shaped surface 40 is forced further into the bladder 34, which increases pressure P and increases the piston diameter D of the actuator 20, thus increasing the effective piston area 44. The increased pressure P and/or the increased effective piston area 44 cause the force F to increase.

However, it is not necessary for both the pressure P and the effective piston area 44 to increase to cause the force F output by the actuator 20 to increase. The force F may be caused to increase when only one of the pressure P and the effective piston area 44 increase.

The force F applies the stabilization force to the steering knuckle 14. Compressing actuator 20 applies an increased stabilization force to the steering knuckle 14. Extending actuator 20 applies a decreased stabilization force to the steering knuckle 14.

Figure 3B:
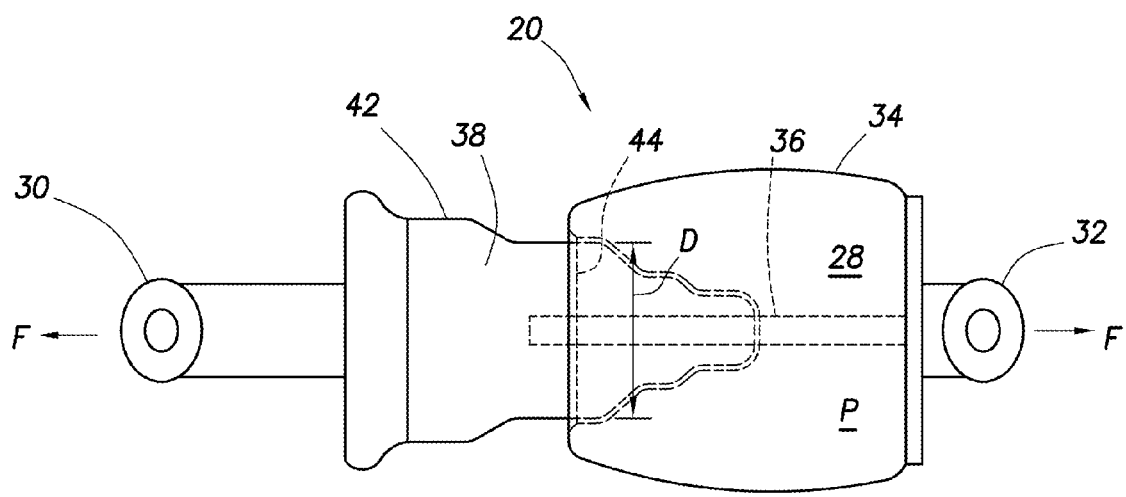
FIG. 3b is a representative side view of another configuration of the pressure operated actuator.

However, the frusto-conical shaped surface 40 is not required to vary the effective piston area 44. For example, a stepped diameter surface 42 (FIG. 3b) may vary the effective piston area 44 as the actuator 20 is extended or compressed. As another example, multiple pistons (not shown) may vary the effective piston area 44 by engaging the bladder 34 at different positions relative to each other as the actuator 20 extends or compresses. Therefore, it should be understood that there are many ways to vary the effective piston area 44 in keeping with the principles of this disclosure.

Substituting the pressure operated actuator 20 for each of the actuators 26 (FIG. 2), the actuators 20 supply a stabilization force that varies in response to rotation of the steering knuckles 14. A force Fa, applied by one of the pressure operated actuators 20, tends to rotate the steering knuckles 14 to the left and opposes a force Fb, applied by another of the pressure operated actuators 20, which tends to rotate the steering knuckles 14 to the right.

As the steering knuckles 14 rotate to the left, the force Fa decreases and the force Fb increases. As the steering knuckles 14 rotate to the right, the force Fa increases and the force Fb decreases.

Therefore, the pressure operated actuators 20 work together to continually urge the tie rod 18 to the centered position where the forces Fa and Fb are substantially equal. The forces Fa and Fb are preferably substantially equal when the pressure operated actuators 20 are equally extended and the pressure P is equally applied to the actuators 20. When the actuators 20 are equally extended, the tie rod 18 may be approximately midway through its travel from side to side (or the "centered position").

Additionally, the forces Fa and Fb may be adjusted by varying the pressure P applied to the fluid 28 disposed within the bladder 34. Increasing the pressure P increases the force F (FIG. 3a) while decreasing the pressure P decreases the force F. Increasing the pressure P to a predetermined level moves the tie rod 18 to the centered position.

Therefore, regardless of the initial position of the steering knuckles 14, when the pressure P is increased to the predetermined pressure level, the suspension system 12 steering will be centered.

Applying the predetermined pressure level to the actuators 20 maintains (or locks) the tie rod 18 in its centered position as long as the sum of the forces Fa and Fb remains greater than any rotational forces Fr. This prevents the steerable suspension system 12 from steering and allows the vehicle operator to easily guide the vehicle 10 while backing up.

Figure 5:
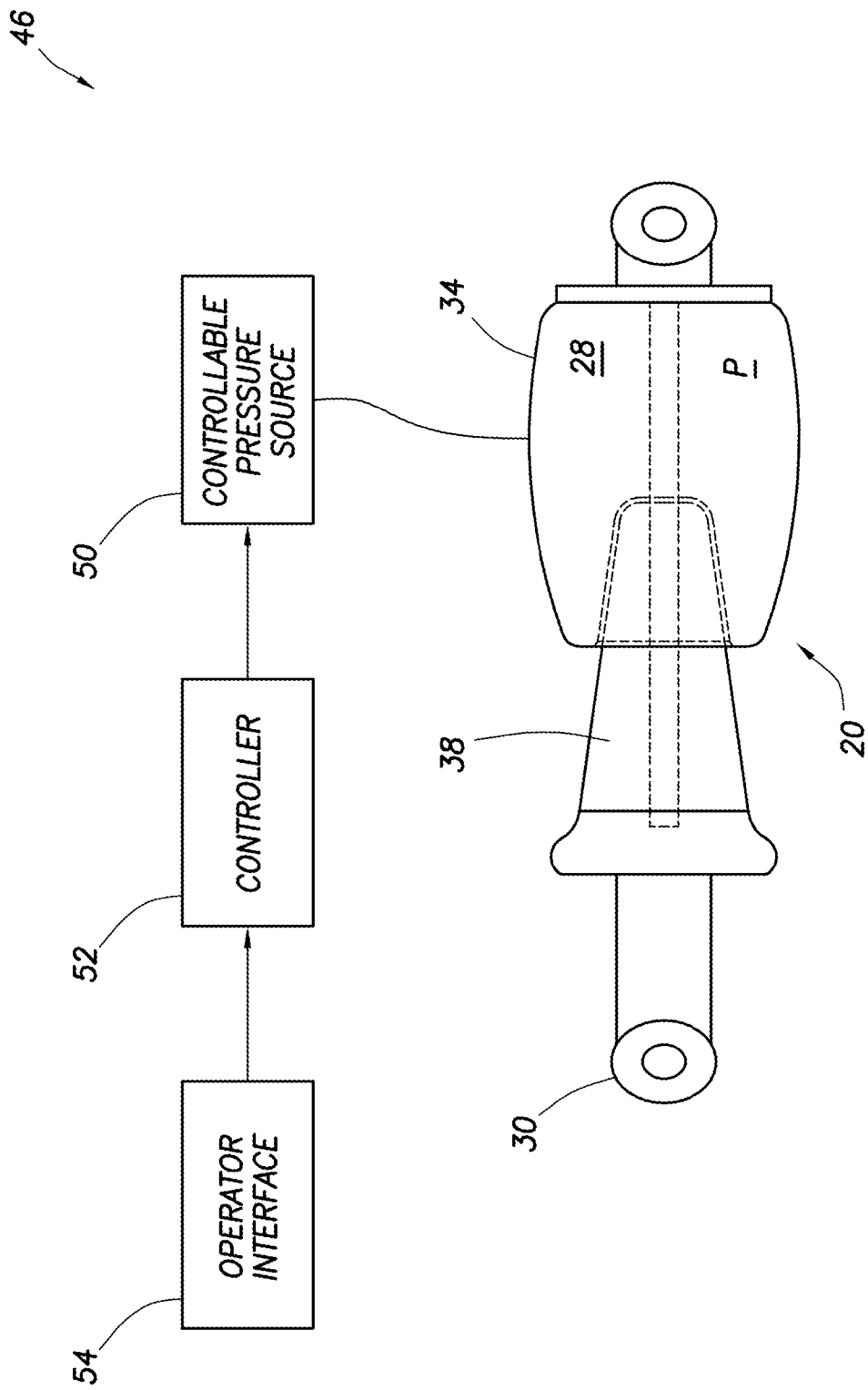
FIG. 5 is a representative control system layout for the pressure operated actuator.

Referring additionally now to FIG. 5, a block diagram of a control system 46 for varying the pressure P is representatively illustrated. The control system 46 may include a controllable pressure source 50 which may be controlled by a controller 52. The controller 52 can receive commands from an operator interface 54 to increase or decrease the pressure P of the fluid 28. These commands may be used to control an output pressure supplied by the controllable pressure source 50.

Figure 6:
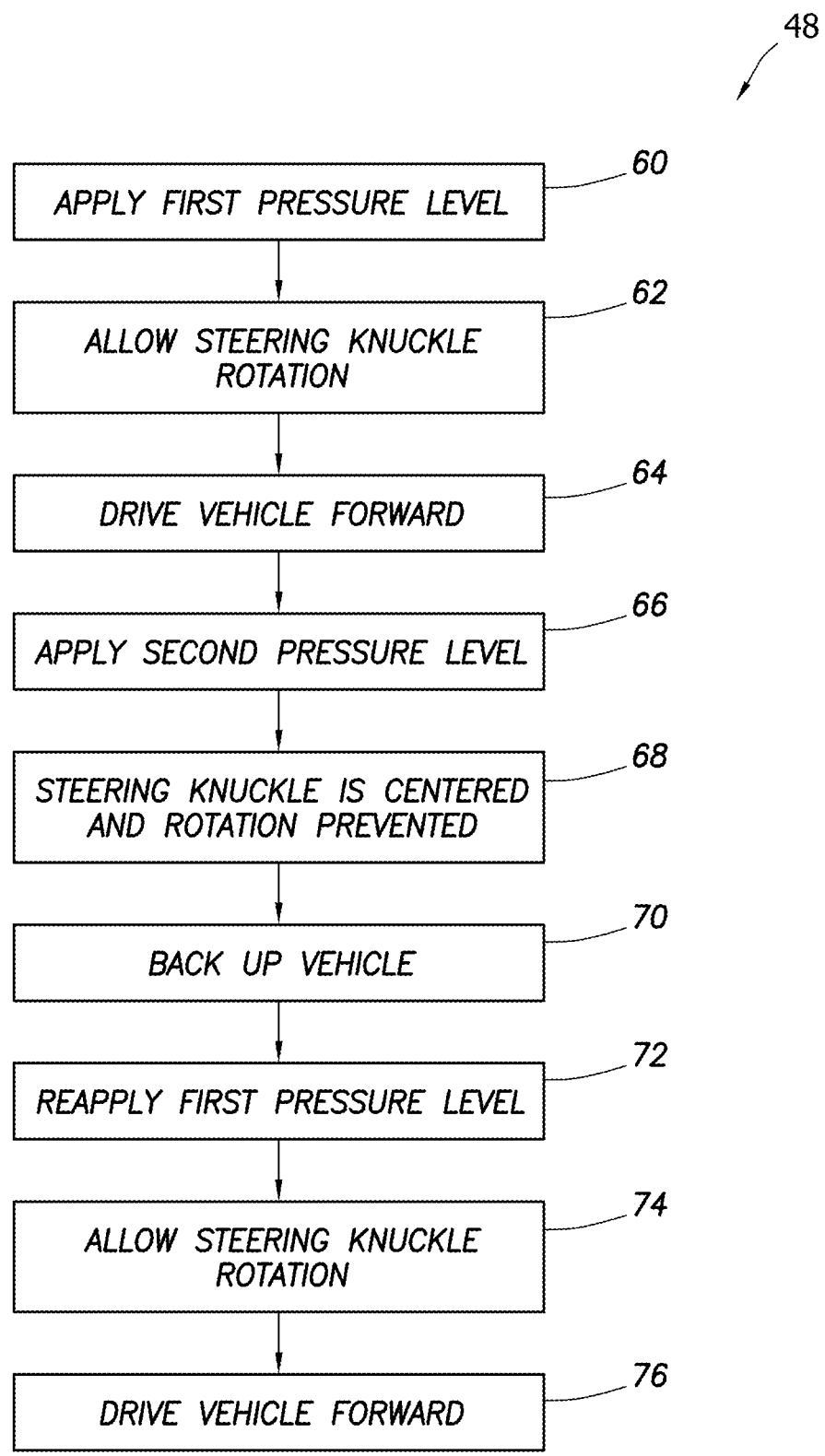
FIG. 6 is a representative flow chart for a method of controlling the pressure operated actuator.

Referring additionally now to FIG. 6, a method 48, which can embody principles of this disclosure, representatively illustrates a flow chart of process steps that may be performed to permit or prevent rotation of the steering knuckle 14. In step 60, a first pressure level is applied to the actuators 20. This first pressure level allows rotation of the steering knuckle 14, while applying a stabilization force to ends of the tie rod 18 (step 62). The first pressure level allows the piston diameter D of the actuators 20 to be substantially different, thereby allowing the steerable suspension system 12 to steer as the vehicle 10 is being driven forward (step 64).

When the operator is ready to backup the vehicle 10, the operator stops the vehicle and applies a second increased pressure level to the actuators 20 (step 66). This second pressure level (e.g. the predetermined pressure level) centers the tie rod 18 and prevents rotation of the steering knuckles 14 (step 68). The piston diameter D of the actuators 20 is substantially the same, resulting in the forces Fa, Fb being substantially the same, which centers the tie rod 18.

At the increased pressure, the forces Fa, Fb are great enough to prevent the suspension system 12 from steering. With the steering knuckles 14 locked in place, the vehicle 10 may now be backed up.

After the vehicle 10 has been backed up and is ready to travel forward again, the first pressure level is again applied to the actuators 20 (step 72). This first pressure level again allows rotation of the steering knuckles 14 (step 74) and allows the steerable suspension system 12 to steer as the vehicle 10 moves forward.

It will now be fully appreciated that the above disclosure provides several advancements to the art of steerable suspension systems. The above disclosure provides to the art a steerable suspension system 12 that may include at least one steering knuckle 14 and at least one actuator 20, the actuator 20 having an effective piston area 44 which varies in response to rotation of the steering knuckle 14. These variations in the effective piston area 44 dampen rotational movement of the steering knuckle 14.

The suspension system 12 also may include an axle 24 and a tie rod arm 16, with the actuator 20 interconnected between the axle 24 and the tie rod arm 16. The actuator 20 may include a conical shaped surface 40 which varies the effective piston area 44 in response to rotation of the steering knuckle 14. The actuator 20 may include an air spring.

The suspension system 12 also may include a controllable pressure source 50 which communicates with the actuator 20 and thereby varies a stabilizing force applied to the steering knuckle 14.

A rotation of the steering knuckle 14 is allowed in response to a reduction in pressure P applied to the actuator 20. Additionally, a rotation of the steering knuckle 14 is prevented in response to an increase in pressure P applied to the actuator 20.

A tie rod 18 is centered in response to an increase in pressure P applied to the actuator 20.

The steering knuckle 14 may comprise multiple steering knuckles 14 and the actuator 20 may comprise multiple actuators 20.

The effective piston area 44 of each of the multiple actuators 20 may be adjusted to be substantially the same in response to an increase in pressure P applied concurrently to the multiple actuators 20 or substantially different in response to a reduction in pressure P applied concurrently to the multiple actuators 20.

A reduction in pressure P applied to the multiple actuators 20 may allow an effective piston area 44 of one of the multiple actuators 20 to increase, and an effective piston area 44 of another of the multiple actuators 20 to decrease, in response to movement of the steering knuckles 14.

Also provided by the above disclosure is a method 48 of stabilizing a steerable suspension system 12. The system 12 may include the steps of applying a first level of pressure P, thereby applying a stabilizing force to at least one steering knuckle 14 and permitting rotation of the steering knuckle 14; and applying a second level of pressure P, thereby preventing rotation of the steering knuckle 14.

The method 48 may further include centering a tie rod 18 in response to applying the second level of pressure p, with the centering being prior to preventing rotation of the steering knuckle 14. An effective piston area 44 of at least one piston 38 may vary in response to rotation of the steering knuckle 14. Additionally, the steering knuckle 14 may be stabilized in response to varying the effective piston area 44 and the piston 38 may be tapered.

The method 48 can include a controllable pressure source 50 for applying the first level of pressure P to multiple pistons 38. The first level of pressure P may allow increasing an effective piston area 44 of one of the multiple pistons 38, and decreasing an effective piston area 44 of another one of the multiple pistons 38, in response to rotation of multiple steering knuckles 14.

Applying the first level of pressure P may permit an effective piston area 44 of the multiple pistons 38 to be substantially different. Applying the second level of pressure P may adjust an effective piston area 44 of the multiple pistons 38 to be substantially the same.

Also provided by the above disclosure is a steerable suspension system 12 that may include an axle 24, at least one tie rod arm 16, and at least one pressure operated actuator 20 interconnected between the tie rod arm 16 and the axle 24. An effective piston area 44 of the actuator 20 varies in response to movement of the tie rod arm 16.

The tie rod arm 16 may be attached to at least one steering knuckle 14 and may move in response to a rotation of the steering knuckle 14. Movement of the tie rod arm 16 may be allowed in response to a reduction in pressure P applied to the actuator 20. Additionally, movement of the tie rod arm 16 may be prevented in response to an increase in pressure P applied to the actuator 20.

The actuator 20 may comprise multiple actuators 20 and the tie rod arm 16 may comprise multiple tie rod arms 16. A reduction in pressure P applied to the multiple actuators 20 may allow an effective piston area 44 of one of the actuators 20 to increase, and an effective piston area 44 of another one of the actuators 20 to decrease, in response to movement of the tie rod arm 16.

Effective piston areas 44 of the actuators 20 may be allowed to be substantially different in response to a reduction in pressure P applied to the actuators 20. Additionally, effective piston areas 44 of the actuators 20 may be caused to be substantially the same in response to an increase in pressure P applied to the actuators 20.

It is to be understood that the various examples described above may be utilized in various orientations, such as inclined, inverted, horizontal, vertical, etc., and in various configurations, without departing from the principles of this disclosure. The embodiments illustrated in the drawings are depicted and described merely as examples of useful applications of the principles of the disclosure, which are not limited to any specific details of these embodiments.

In the above description of the representative examples of the disclosure, directional terms, such as "left," "right," "up," "down," etc., are used for convenience in referring to the accompanying drawings.

Of course, a person skilled in the art would, upon a careful consideration of the above description of representative embodiments, readily appreciate that many modifications, additions, substitutions, deletions, and other changes may be made to these specific embodiments, and such changes are within the scope of the principles of this disclosure. Accordingly, the foregoing detailed description is to be clearly understood as being given by way of illustration and example only, the spirit and scope of the present invention being limited solely by the appended claims and their equivalents.

What is claimed is:

1. A steerable suspension system comprising:
at least one steering knuckle and at least one actuator,
the actuator having an effective piston area which varies in response to rotation of the steering knuckle.

2. The suspension system of claim 1, wherein variations in the effective piston area dampen rotational movement of the steering knuckle.

3. The suspension system of claim 1, further comprising an axle and a tie rod arm, and wherein the actuator is interconnected between the axle and the tie rod arm.

4. The suspension system of claim 1, wherein the actuator comprises a conical shaped surface which varies the effective piston area in response to rotation of the steering knuckle.

5. The suspension system of claim 1, wherein the actuator comprises an air spring.

6. The suspension system of claim 1, further comprising a controllable pressure source which communicates with the actuator and thereby varies a stabilizing force applied to the steering knuckle.

7. The suspension system of claim 1, wherein a rotation of the steering knuckle is allowed in response to a reduction in pressure applied to the actuator.

8. The suspension system of claim 1, wherein a rotation of the steering knuckle is prevented in response to an increase in pressure applied to the actuator.

9. The suspension system of claim 1, wherein a tie rod is centered in response to an increase in pressure applied to the actuator.

10. The suspension system of claim 1, wherein the at least one steering knuckle comprises multiple steering knuckles and the at least one actuator comprises multiple actuators.

11. The suspension system of claim 10, wherein the effective piston areas of the multiple actuators are adjusted to be substantially the same in response to an increase in pressure applied concurrently to the multiple actuators.

12. The suspension system of claim 10, wherein the effective piston areas of the multiple actuators are permitted to be substantially different in response to a reduction in pressure applied concurrently to the multiple actuators.

13. The suspension system of claim 10, wherein a reduction in pressure applied to the multiple actuators allows an effective piston area of one of the multiple actuators to increase, and an effective piston area of another one of the multiple actuators to decrease, in response to movement of the steering knuckles.

14. A method of stabilizing a steerable suspension system, the method comprising the steps of:
  applying a first level of pressure, thereby applying a stabilizing force to at least one steering knuckle and permitting rotation of the steering knuckle;
  varying an effective piston area of at least one piston in response to rotation of the steering knuckle; and
  applying a second level of pressure, thereby preventing rotation of the steering knuckle.

15. The method of claim 14, further comprising the step of centering a tie rod in response to applying the second level of pressure, wherein the centering is prior to preventing rotation of the steering knuckle.

16. The method of claim 14, wherein the varying step may include stabilizing the steering knuckle in response to varying the effective piston area.

17. The method of claim 14, wherein the piston is tapered.

18. The method of claim 14, wherein the applying steps comprise a controllable pressure source which applies the first and second levels of pressure to at least one piston.

19. The method of claim 18, wherein the at least one piston comprises multiple pistons, and wherein the at least one steering knuckle comprises multiple steering knuckles.

20. The method of claim 19, wherein applying the first level of pressure to the multiple pistons allows increasing a first effective piston area of one of the multiple pistons, and decreasing a second effective piston area of another one of the multiple pistons, in response to rotation of the steering knuckles.

21. The method of claim 19, wherein applying the first level of pressure permits effective piston areas of the multiple pistons to be substantially different in response to the application of the first level of pressure.

22. The method of claim 19, wherein applying the second level of pressure adjusts effective piston areas of the multiple pistons to be substantially the same in response to the application of the second level of pressure.

23. A steerable suspension system comprising:
  an axle,
  at least one tie rod arm, and
  at least one pressure operated actuator which is directly pivotably attached to each of the tie rod arm and the axle, wherein an effective piston area of the actuator varies in response to movement of the tie rod arm.

24. The suspension system of claim 23, wherein the tie rod arm is attached to at least one steering knuckle and moves in response to a rotation of the steering knuckle.

25. The suspension system of claim 23, wherein movement of the tie rod arm is allowed in response to a reduction in pressure applied to the actuator.

26. The suspension system of claim 23, wherein movement of the tie rod arm is prevented in response to an increase in pressure applied to the actuator.

27. The suspension system of claim 23, wherein the actuator comprises multiple actuators and the tie rod arm comprises multiple tie rod arms.

28. The suspension system of claim 27, wherein a reduction in pressure applied to the multiple actuators allows a first effective piston area of one of the multiple actuators to increase, and a second effective piston area of another one of the multiple actuators to decrease, in response to movement of the tie rod arm.

29. The suspension system of claim 27, wherein effective piston areas of the multiple actuators are allowed to be substantially different in response to a reduction in pressure applied to the multiple actuators.

30. The suspension system of claim 27, wherein effective piston areas of the multiple actuators are caused to be substantially the same in response to an increase in pressure applied to the multiple actuators.

* * * * *